United States Patent [19]
Petruccello

[11] Patent Number: 5,161,428
[45] Date of Patent: Nov. 10, 1992

[54] ROTATABLE SLIDER BODY

[75] Inventor: John P. Petruccello, Detroit, Mich.

[73] Assignee: Teleflex Incorporated, Limerick, Pa.

[21] Appl. No.: 685,895

[22] Filed: Apr. 16, 1991

[51] Int. Cl.$^5$ .............................................. F16C 1/10
[52] U.S. Cl. ............................... 74/502.4; 74/501.5 R; 74/502; 403/197; 192/111 A
[58] Field of Search ............ 74/502.4, 502.6, 500.5, 74/501.5 R; 192/111 A; 403/197, 196, 104; 188/77 W, 67

[56] References Cited
U.S. PATENT DOCUMENTS

| | | | |
|---|---|---|---|
| 3,572,159 | 3/1971 | Tschanz | 74/501 |
| 4,177,691 | 12/1979 | Fillmore | 74/501 |
| 4,238,974 | 12/1980 | Fawcett | 74/502.5 |
| 4,294,133 | 10/1981 | Hurley | 74/502.4 |
| 4,380,178 | 4/1983 | Bennett et al. | 74/502 |
| 4,458,552 | 7/1984 | Spease et al. | 74/502.4 |
| 4,726,251 | 2/1988 | Niskanen | 74/502.5 |
| 4,751,851 | 6/1988 | Deligny et al. | 74/501.5 R |
| 4,805,479 | 2/1989 | Brightwell | 74/502.4 |
| 4,811,621 | 3/1989 | Spease | 74/502.4 |
| 4,969,372 | 11/1990 | Muhlecker et al. | 74/502 |

Primary Examiner—David A. Scherbel
Assistant Examiner—Winnie Yip
Attorney, Agent, or Firm—Reising, Ethington, Barnard, Perry & Milton

[57] ABSTRACT

A motion transmitting remote control assembly (10) for transmitting forces along a curved path by a flexible core element (26) slidably disposed witin a flexible conduit (12). The assembly (10) includes an elongated member (62) for adjusting the longitudinal position of the conduit (12) by being slidably disposed within a passageway (68) of a support member (32). A locking clip (86) is movable between a disengaged position for permitting relative longitudinal movement between the elongated member (62) and the base (32) and an engaged position for preventing longitudinal movement therebetween. The improvement resides in the elongated member (62) being rotatably supported on the conduit (12) to allow rotation of the conduit (12) relative to the support member (32) while in an engaged position.

10 Claims, 3 Drawing Sheets

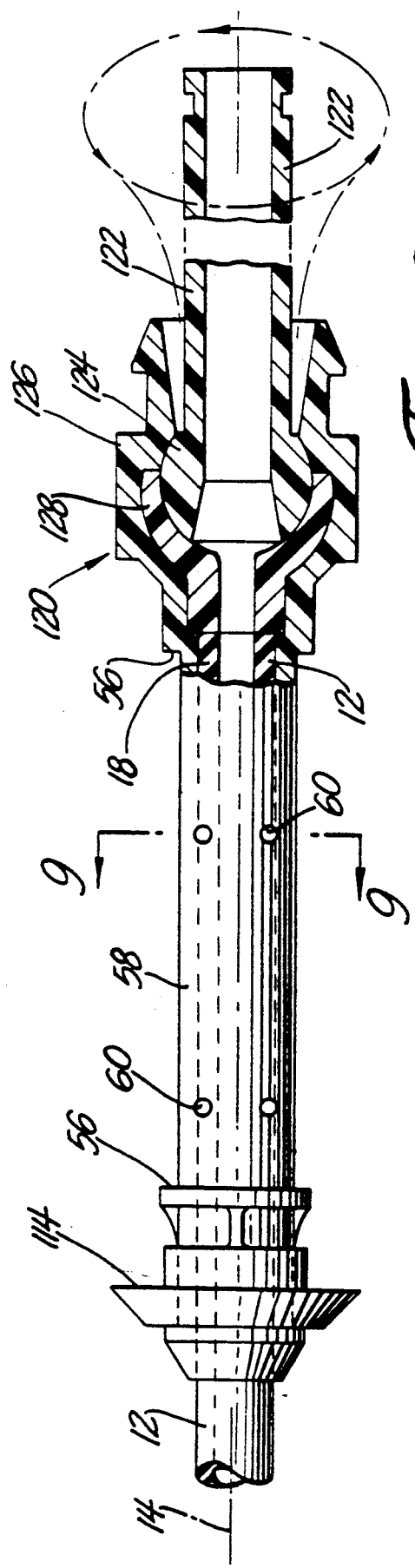
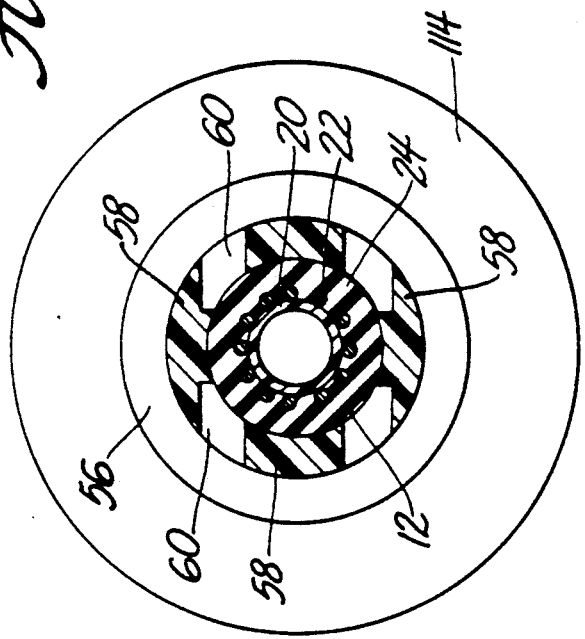
Fig. 8
Fig. 9

ROTATABLE SLIDER BODY

BACKGROUND OF THE INVENTION

1. Technical Field

The subject invention relates to a motion transmitting remote control assembly of the type for transmitting motion along a curved path by a flexible motion transmitting core element movably supported within a flexible conduit. More specifically, the subject invention relates to an assembly including means for adjusting the longitudinal length of the conduit.

2. Description of the Related Art

Remote control assemblies including adjustment means for adjusting the position of a conduit are well known in the art. Such remote control assemblies normally include support means adjacent each end of the conduit for attaching the conduit to support structures. A core element is slidably disposed within the conduit with its ends extending therefrom. The ends of the core element are adapted to interconnect a control member and an actuated member for transmitting forces therebetween. It is frequently desirable to adjust the effective length of the core element after it has been interconnected between the control and actuated members For example, during installation of an assembly in a vehicle, the effective length of the core element between the control member and the actuated member often needs adjustment due to variances in structural specifications; that is, the relative distances between the control member and the actuated member often vary from vehicle to vehicle. Accordingly, to effect such an adjustment, the core element must be routed along a more or less direct path, between the control and actuated members, to shorten or lengthen its effective length therebetween. To effect such an adjustment, the control member is positioned at an extreme position and the actuated member is subsequently adjusted to its corresponding extreme position by routing the core element through a more or less direct path as required. In order to effect such an adjustment of the core element, however, it is necessary to adjust the position of the conduit relative to the support means.

An assembly for accomplishing such adjustment is shown in U.S. Pat. No. 4,177,691 in the name of Fillmore and assigned to the assignee of the subject invention. The Fillmore '691 Patent discloses an assembly with an adjustment member disposed on the end of the conduit and extending through a passageway in a support member adapted for attachment to a support structure and with a locking member movable between engaged and disengaged positions for respectively preventing relative movement between the adjustment member and the support member and for allowing such relative movement.

Although the Fillmore '691 assembly provides a fast and effective means for adjusting the position of the conduit relative to the support means, it does not permit rotation between the conduit and the support means. As is often the case, the support structures for securing the conduit are not conveniently located. Accordingly, the conduit must be twisted and deformed through an indirect path. Unfortunately, this deformation and twisting of the conduit causes it to bind thereby resulting in increased resistance in relative movement between the core element and the conduit.

U.S. Pat. No. 3,572,159 granted Mar. 23, 1971 to August E. Tschanz and assigned to the assignee of the subject invention, discloses an assembly similar to that just described. However, the Tschanz '159 assembly includes a locking member having a circular opening with threads therein for engaging a circular adjustment member. Although this circular arrangement allows for relative rotation between the conduit and the support member, such rotation in fact changes the effective length of adjustment of the assembly. That is, by rotating the conduit relative to the support member, the circular adjustment member actually "threads" or "screws" longitudinally through the circular threads of the locking member. Consequently, the rotation of the conduit is obtained at the expense of changing the adjustment of the conduit. Additionally, when the locking member moves slightly from its fully engaged position, large portions of its circular threads become disengaged with the adjustment member, thereby decreasing the holding power of the locking member upon the adjustment member. Partial disengagement is particularly common in vehicular applications due to the jarring and vibration most assemblies are exposed to. Accordingly, applications for such an assembly are limited.

SUMMARY OF THE INVENTION AND ADVANTAGES

The present invention is directed toward a motion transmitting remote control assembly for transmitting forces from a control member to an actuated member along a curved path by a flexible motion transmitting core element. The assembly comprises a conduit extending along a longitudinal axis and having first and second ends. A core element is movably supported by the conduit and has first and second ends thereof extending from the ends of the conduit. An adjustment means is attached to the conduit for adjusting the longitudinal position of the conduit. The assembly further includes a support means adapted for attachment to a support structure. A locking means is supported by the support means and is movable between engaged and disengaged positions for allowing relative movement between the adjustment means and the support means along the longitudinal axis when in the disengaged position and for preventing the relative movement when in the engaged position. The assembly is characterized by the conduit being rotatably supported by the adjustment means.

An advantage of rotatably supporting the conduit relative to the adjustment means is realized by less binding of the conduit and smoother relative movement between the core element and the conduit. Additionally, the subject invention's specific rotatable arrangement overcomes the problems of decreased holding power between the adjustment means and locking clip by providing a straight teeth lock between the adjustment means and locking clip, in place of a circular thread arrangement. Another advantage of the subject invention is that the conduit is permitted to rotate relative to the adjustment member without effecting its longitudinal position relative thereto.

BRIEF DESCRIPTION OF THE DRAWINGS

Other advantages of the subject invention will be readily appreciated as the same becomes better understood by reference to the following detailed description when considered in connection with the accompanying drawings wherein:

FIG. 8 is an enlarged side view partially broken away and in cross section of the preferred embodiment of the swivel means, base member; and FIG. 9 is an enlarged cross sectional view taken along line 9—9 of FIG. 8.

DETAILED DESCRIPTION OF THE PREFERRED EMBODIMENT

Figure 1:
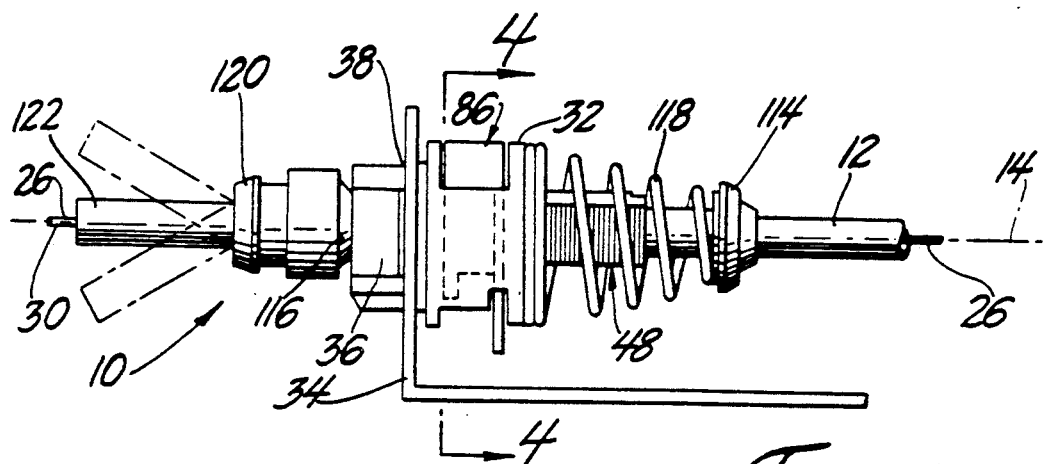
FIG. 1 is a side view of a preferred embodiment of the subject invention showing the locking means in the engaged position and the swivel tube at various positions.
Figure 2:
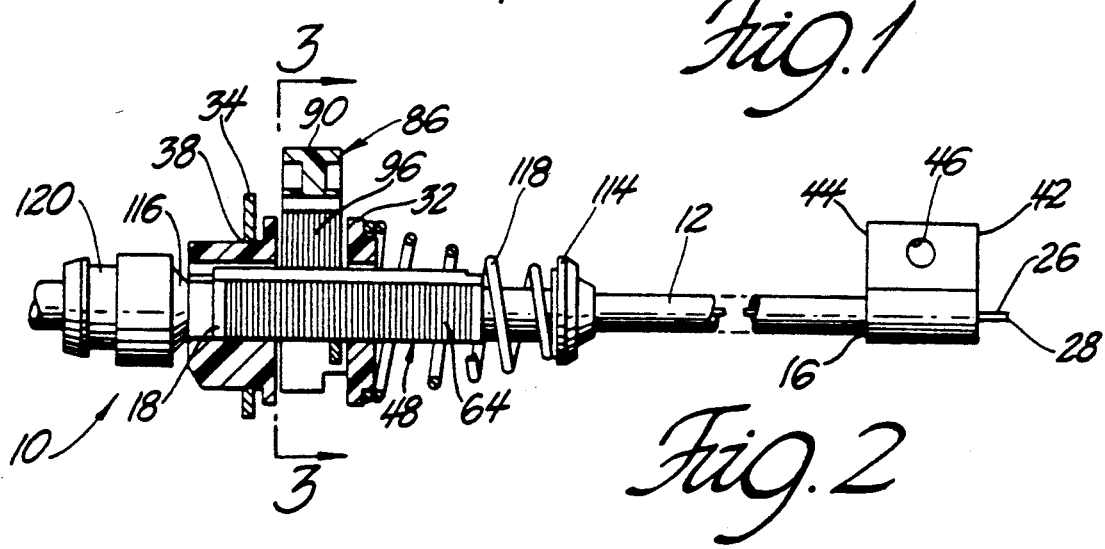
FIG. 2 is a side view partially broken away and in cross section, showing the locking means in the disengaged position.
Figure 3:
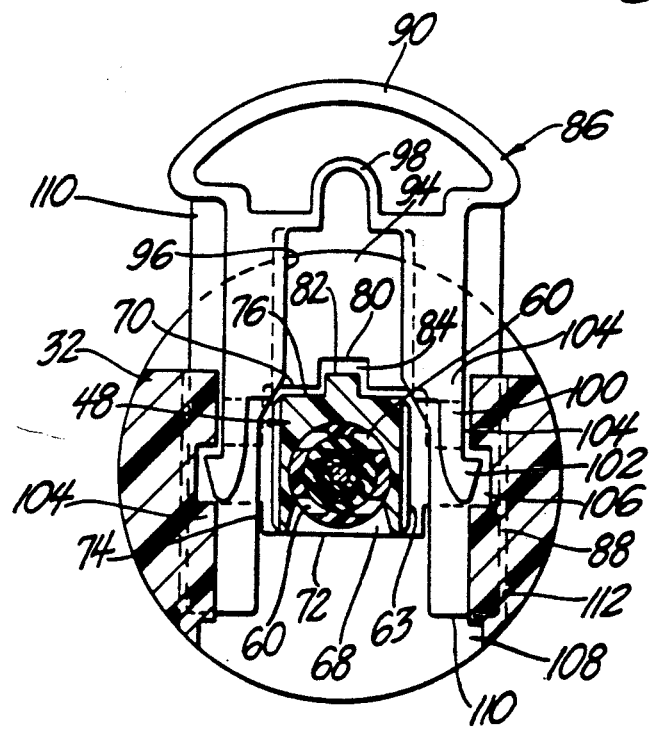
FIG. 3 is an enlarged cross sectional view taken along line 3—3 of FIG. 2.
Figure 4:
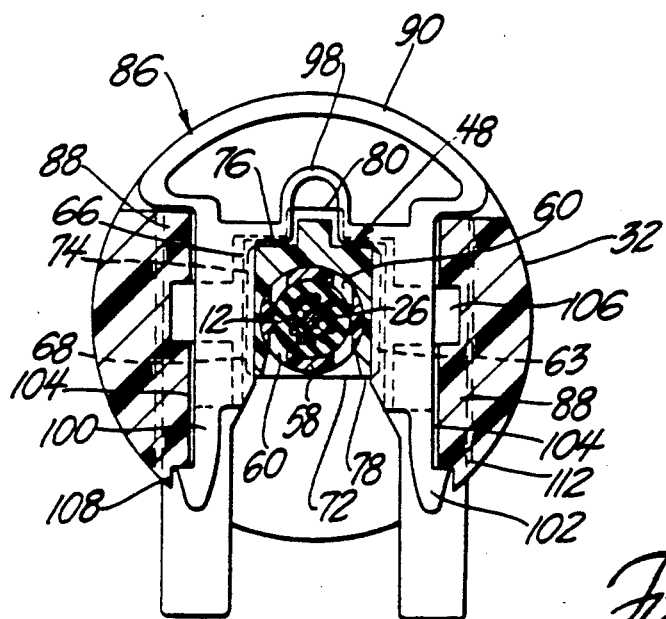
FIG. 4 is an enlarged cross sectional view taken along line 4—4 of FIG. 1.

Referring now to the drawings wherein like numerals indicate like or corresponding parts throughout the several views, a motion transmitting remote control assembly for transmitting forces from a control member to an actuated member, along a curved path by a flexible motion transmitting core element, is generally shown at 10 in FIGS. 1 and 2. The assembly 10 includes a flexible conduit shown at 12. The conduit 12 extends along its longitudinal axis 14 and includes first 16 and second 18 (best shown in FIG. 8) ends. The conduit 12 is preferably of the well known type including an inner tubular member 20 made of organic polymeric material surrounded by a plurality of long lay wires 22 disposed helical thereabout with a casing 24 of organic polymeric material disposed about the long lay wires 22 and about the inner tubular member 20 as best shown in FIGS. 3,4, and 9.

A motion transmitting core element 26 is movably supported within the conduit 12 and has first 28 and second 30 ends thereof extending from the ends 16, 18 of the conduit 12. The motion transmitting core element 26 is a wire member but may also comprise metal or other fibrous strands helically wound together in cable-like fashion. Coupling members (not shown) are preferably used to secure the first 28 and second 30 ends of the core element 26 to the control and actuated members.

Support means for supporting one end of the assembly 10 is shown at 32. The support means 32 comprises a generally circular support member or base and is adapted for attachment to a support structure 34, such as a bracket or a bulkhead, best shown in FIG. 1. More specifically, the support member 32 includes a snap-in means 36 adapted for insertion through an opening 38 in the support structure 34 to retain the support member 32 secured thereto. The snap-in means 36 preferably comprises two biasing arms (not shown, but commonly in the art). During installation of the assembly 10, the biasing arms of the support member 32 are forced through an opening 38 in the support structure 34. The force exerted upon the support member 34 must be sufficient enough to compress the biasing arms so that they fit through the opening 38. Once through the opening 38, the biasing arms bias outwardly thereby retaining the support member 32 against the support structure 34.

A support fitting 42 attached to the first end 16 of the conduit and is adapted for securing the conduit 12 to another support structure (not shown). The support fitting 42 may be any of the well known types such as that shown in FIG. 2, including a flange 44 having a hole 46 therein for receiving attachment means (not shown) such as a rivet, bolt and the like for securing the flange 44 to the support structure.

Figure 5:
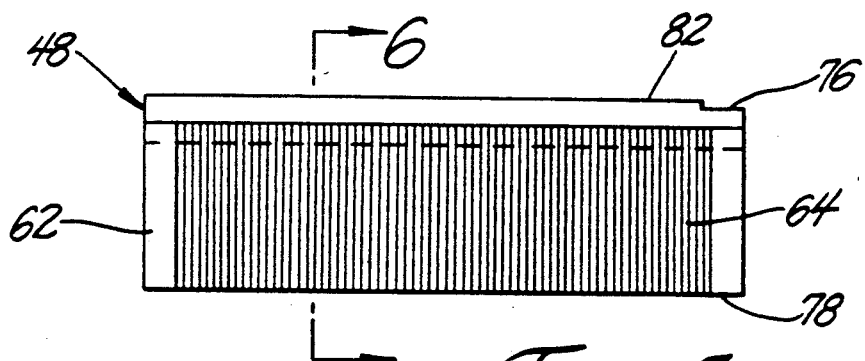
FIG. 5 is an enlarged side view of the preferred embodiment of the adjustment means.

Adjustment means, generally indicated at 48, is rotatably attached to the conduit 12 for adjusting the longitudinal position of the conduit 12. The adjustment means 48, best shown in FIGS. 5 and 6, includes a conduit channel 50 for rotatably supporting the conduit 12 therein. The adjustment means 48 further includes a conduit receiving slot 52 for receiving the conduit 12 into the conduit channel 50. Resilient ridges 54 for retaining the conduit 12 within the conduit channel 50 are disposed between the conduit channel 50 and the receiving slot 52. The abutment means 56, best shown in FIG. 8, are enlarged portions protruding radially outwardly from the conduit 12. A base member 58 is integrally disposed about the conduit 12 along the longitudinal axis 14. Abutment means 56 are disposed about the base member 58, preferably adjacent the second end 18 of the conduit 12. The base member 58 and abutment means 56 are molded about the conduit 12 so that they are integral therewith, that is, relative rotation therebetween is limited. During the molding process, orientation pins (not shown) orientate the conduit 12 before the abutment means 56 and base member 58 are molded thereabout. As a consequence, orientation holes 60 are left in the base member 58, as shown in FIGS. 3, 4, 8, and 9.

The adjustment means 48 is attached to the conduit 12 by positioning the base member 58 in the receiving slot 52 and forcing the base member 58 against the resilient ridges 54. The force exerted by the base member 58 against the resilient ridges 54 must be sufficient to expand the ridges 54 radially outward thereby exposing the conduit channel 50. Once the resilient ridges 54 have been force outward, the conduit 12 (and base member 58 integral thereabout) is positioned within the conduit channel 50 where it is rotatably supported. Preferably, the base member 58 and conduit channel 50 are approximately of complementary size, that is, the circumference of the conduit channel 50 is only slightly larger than that of the base member 58 so that the circumferential surface of the base member 58 is in constant contact with the conduit channel 50. After the conduit 12 has been positioned within the conduit channel 50, the resilient ridges 54 return to their unexpanded position thereby retaining the conduit 12 and base member 58 within the conduit channel 50. In a similar manner, the conduit 12 can be removed from the conduit channel 50 by overcoming the biasing force of the resilient ridges 54, thereby forcing them 54 apart and exposing the conduit channel 50 to the receiving slot 52. The adjustment means 48 is attached to the base member 58 at a position between the abutment means 56. Preferably, the length of the adjustment means 48 closely approximates the distance between the abutment means 56 i.e. the length of the base member 58, so that the ends of the adjustment means 48 abut between each abutment means 56; that is, relative longitudinal movement between the adjustment means 48 and the conduit 12 is limited by the adjustment means 48 abutting the abutment means 56.

Figure 6:
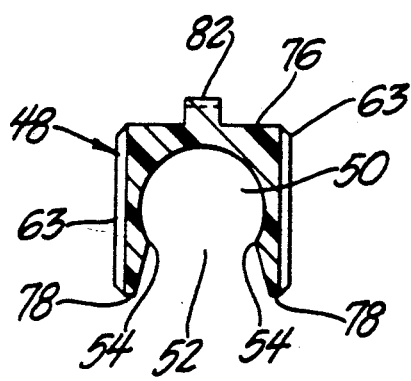
FIG. 6 is a cross sectional view taken along line 6—6 of FIG. 5.

The adjustment means 48 comprises an elongated member 62 or body portion having oppositely facing sides 63, as shown in FIG. 6. A plurality of straight adjustment teeth 64 are disposed in side by side relationship along the sides 63 and extend therefrom in a direction transverse to said longitudinal axis 14.

Guide means 66 defined by a passageway 68 extending through the support member 32 and along the longitudinal axis 14 is included for guiding the movement of the elongated member 62 therethrough while preventing rotation of the elongated member 62 relative to the support member 32. The passageway is preferably rectangular and similar in dimension as the adjustment means 48. The passageway 68 includes upper 70 and lower 72 surfaces and side surfaces 74. The elongated member 62 includes top 76 and bottom 78 sides slidably engaging the upper 70 and lower 72 surfaces of the passageway 68, respectfully. To assist the longitudinal movement of the elongated member 62, through the passageway 68, a groove 80 is positioned along the upper surface 70 of the passageway 68 for receiving a rib 82. The rib 82 extends from the elongated member's 62 top side 76 and is slidably disposed within the groove 80. In addition to assisting longitudinal movement the rib/groove arrangement limits rotation between the elongated member 62 and the passageway 68. A space region 84 is formed between the rib 82 and the groove 80. When the elongated member 68 is molded, the parting line or points of flash (not shown) are formed along the top of the rib 82. The space region 84 insures that the flash will not engage the bottom of the groove 80 to inhibit longitudinal movement of the elongated member 62 relative to the support member 32.

Figure 7:
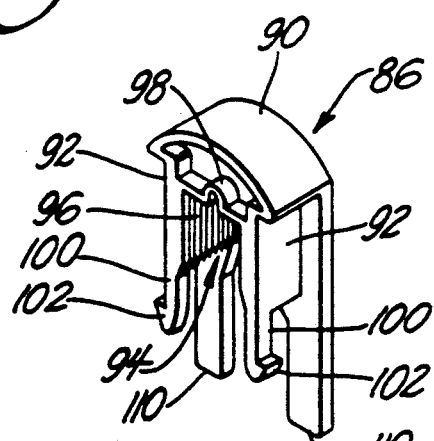
FIG. 7 is perspective view of the preferred embodiment of the locking means.

Locking means for permitting selective longitudinal movement between the adjustment means 48 and the support member 32 is generally indicate at 86. As shown in FIG. 7, the locking means 86 is essentially a lock clip. The locking means 86 is supported by the support member 32 and is movable between an engaged position (shown in FIG. 1 and 4) and a disengaged position (shown in FIGS. 2 and 3). When the locking means 86 is in the engaged position, relative longitudinal movement between the adjustment means 48 and the support member 32 is limited, whereas when in the disengaged position, relative longitudinal movement between the adjustment means 48 and the support member 32 is permitted. The support member 32 includes a transverse pathway 88 extending therethrough in a direction transverse to and intersecting the passageway 68. The locking means 86 is disposed in the transverse pathway 88 and movable therein between the engaged position and disengaged position.

Turning to FIG. 7, the locking means 86 includes a head 90, facing flanks 92 and a space area 94 therein A plurality of locking teeth 96 are arranged side by side along the flanks 92 and project inwardly toward the space area 94. The locking teeth 96 extend in a direction transverse to the longitudinal axis 14 for engaging the adjustment teeth 64 of the adjustment means 48 when the locking means 86 is in the engaged position (shown in FIG. 4). A notch 98 in the head, is positioned on the top of the space area 94 for receiving the rib 82 of the elongated member 62 when the locking means 86 is in the engaged position.

At least one flexible finger 100 extends downward from the flanks 92. Ideally, a flexible finger 100 extends downwardly from each flank 92. Each of the flexible fingers 100 include a projection 102 extending laterally therefrom. The support member 32 includes two finger channels 104 positioned along the transverse pathway 88, slidably receiving the flexible fingers 100 therein. The finger channels 104 include first 106 and second 108 recesses positioned therealong for receiving the projections 102 therein to retain the locking means 86 in the disengaged and engaged positions respectfully.

The locking means 86 includes at least one flange 110, but preferably two. Each flange 110 extends downwardly from each flank 92. The support member 32 includes two flange channels 112 extending along the transverse pathway 88, slidably receiving the flanges 110 therein for guiding the movement of the locking means 86 along the transverse pathway 88 between the disengaged and engaged positions.

The base member 58 includes first 114 and second 116 collars thereon, positioned adjacent the 56 abutment means, for limiting movement of the adjustment means 48 relative to the support member 32. A biasing means 118, preferably a spring, is disposed between the first collar 114 and the support member 32 for urging the adjustment means 48 to move relative to the support member 32. Thus, when the locking means 86 in the disengaged position, the biasing means 118 urges the adjustment means 48 against the second collar 116.

Swivel means 120 may be positioned adjacent the second collar 116 for supporting the core element 26 at acute angles from the longitudinal axis 14, best shown in FIGS. 1, 2, and 8. The swivel means 120 includes a swivel tube 122 having a spherical end 124 and is capable of pivoting at various acute angles. A swivel socket 126 integrally secured to the base member 58 is positioned about the longitudinal axis 14. A spacer, shown at 128, is positioned within the swivel socket 126. The spherical end 124 is slidably retained between the swivel socket 126 and the spacer 128. The core element 26 passes through the swivel socket 126 and exits out the swivel tube 122.

The adjustment means 48, the support member 32 and the locking means 86 are all preferably made of organic polymeric materials. The support member 32 has a substantially circular exterior extending about the longitudinal axis 14 and the head 90 of the locking means 86 is contiguous with the substantially circular exterior of the support member 32 when the locking means 86 is in the engaged position.

In operation, the assembly 10 transmits forces from a control member to an actuated member along a curved path by way of a core element 26. One application of the subject assembly 10 is with vehicular transmissions. For example, the first end 28 of the core element 26 may be attached to a transmission selector by way of a common coupling member, the second end 30 thereof attached to a transmission actuator member by an additional coupling member. The core element 26 is supported by the conduit 12 which is in turn supported by the support member positioned adjacent its ends 16, 18, as previously described.

During installation, the effective length of the core element 26, between the transmission selector (control member) and actuator, often needs adjustment due to variances in structural designs. That is, the relative distance between the selector and actuator often varies from vehicle to vehicle. Accordingly, to adjust the core element 26 relative to the selector and actuator, the core element 26 must be routed along a more or less direct path between the selector and actuator, to shorten or lengthen its effective length therebetween. For example, to effect an adjustment, the selector is positioned at an extreme position e.g., PARK. The actuated member is then adjusted to its corresponding extreme position by routing the core element 26 through a more or less direct path. More specifically, by routing the core element 26 through various paths, the core element's effective length between the actuator and selector is selectively adjusted. In order to effect such adjustments, the adjustment means 48 is disengaged from the locking means 86 in a manner as previously described, thereby allowing the conduit to move relative to the actuator or selector. After an adjustment has been made, the locking means 86 is engaged (as previously described), thereby locking the adjustment means 48 in position and limiting further relative longitudinal movement of the conduit 12. The conduit 12 is supported by securing it to support structures with support member as previously described. As often is the case, the support structures are not conveniently located for securing the conduit 12 thereto. Accordingly, the conduit 12 must be twisted or deformed through an indirect path. Unfortunately, the twisting necessary to wrap the conduit through the indirect path causes the conduit 12 to kink, bind, or otherwise strain, thereby resulting in increased resistance to relative movement between the core element 26 and the conduit 12 and additionally making installation of the assembly 10 more difficult. In the subject invention, however, the conduit 12 is rotatably supported by the adjustment means 48. Thus, the conduit 12 is free to rotate relative to the adjustment means 48, locking means 86, support member 32 and support structure 34, thereby avoiding the kinking and binding problems commonly associated with similar assemblies. This rotation is clearly indicated in FIGS. 3 and 4 by the change in position of the orientation holes 60. As described previously, the orientation holes 60 are disposed through the base member 58 as the base member 58 is integrally attached about the conduit 12. The orientation holes 60 are a result of the molding process and serve no operative function, however, for the purposes of demonstrating the rotation of the conduit 12 relative to the adjustment means 48, the orientation holes 60 serve as an illustrative reference point.

The invention has been described in an illustrative manner, and it is to be understood that the terminology which has been used is intended to be in the nature of words of description rather than limitation.

Obviously, many modifications and variations of the instant invention are possible in light of the above teachings. It is, therefore, to by understood that within the scope of the appended claims, the invention may be practiced otherwise than as specifically described.

What is claimed:

1. A motion-transmitting remote control assembly (10) for transmitting forces from a control member to an actuated member along a curved path by a flexible motion transmitting core element (26), said assembly comprising;
    a conduit (12) extending along a longitudinal axis (14) and having first (16) and second (18) ends,
    a core element (26) movably supported by said conduit (12) and having first (28) and second (30) ends thereof extending from said ends (16,18) of said conduit (12),
    adjustment means (48) attached to said conduit (12) for adjusting the longitudinal position of said conduit (12),
    support means (32) adapted for attachment to a support structure (34),
    locking means (86) supported by said support means (32) and movable between engaged and disengaged positions for allowing relative movement between said adjustment means (48) and said support means (32) along said longitudinal axis (14) when in said disengaged position and for preventing said relative movement when in said engaged position,
    said assembly characterized by said adjustment means (48) including rotation means for rotatably supporting said conduit (12) relative to said adjustment means.

2. An assembly as set forth in claim 1 further characterized by said rotation means including a conduit channel (50) for rotatably supporting said conduit (12) therein.

3. An assembly as set forth in claim 2 further characterized by said rotation means (48) including a conduit receiving slot (52) for receiving said conduit (12) into said conduit channel (50).

4. An assembly as set forth in claim 3 further characterized by said rotation means (48) including resilient ridges (54) for retaining said conduit (12) within said conduit channel (50).

5. An assembly as set forth in claim 4 wherein said adjustment means (48) includes an elongated member (62) having oppositely facing sides (63), said sides including a plurality of straight adjustment teeth (64) disposed in side by side relationship therealong and extending in a direction transverse to said longitudinal axis (14),
    said assembly further characterized by said locking means (86) including a plurality of straight locking teeth (96) for engaging said adjustment teeth (64) when in said engaged position and guide means (66) defined by a passageway (68) extending through said support means (32) and along said longitudinal axis (14) for guiding the movement of said elongated member (62) therethrough while preventing rotation of said elongated member (62) relative to said support means (32).

6. An assembly as set forth in claim 5 further characterized by said conduit (12) including abutment means (56) for limiting relative longitudinal movement between said adjustment means (48) and said conduit (12).

7. An assembly as set forth in claim 6 further characterized by said conduit (12) including a base member (58) integrally interconnecting said abutment means (56) and disposed about said conduit (12) along said longitudinal axis (14), said base member (58) rotatably disposed within said conduit channel (50) of said adjustment means (48).

8. An assembly as set forth in claim 7 further characterized by said passageway (68) in said guide means (66) including upper (70) and lower (72) surfaces and side surfaces (74), said elongated member (62) including top (76) and bottom (78) sides slidably engaging said upper (70) and lower (72) surfaces of said passageway (68), respectfully.

9. An assembly as set forth in claim 8 further characterized by said passageway (68) including a groove (80) in said upper surface (70) and said elongated member (62) including a rib (82) extending from said top side (76) slidably disposed within said groove (80) and defining a space region (84) between said rib (82) and said groove (80).

10. An assembly as set forth in claim 9 further characterized by said support means (32) including a transverse pathway (88) extending therethrough in a direction transverse to and intersecting said passageway (68), said locking means (86) being disposed in said transverse pathway (88) for movement between said engaged and disengaged positions, said locking means (86) including facing flanks (92) and defining a space area (94) therebetween, said locking teeth (96) being arranged side by side along said flanks (92) and extending in a direction transverse to said longitudinal axis (14) for engaging said adjustment teeth (64) of said adjustment means (48) when said locking means (86) is in said engaged position, said locking means (86) including a notch (98) on the top of said space area (94) for receiving said rib (82) along said top side (76) of said elongated member (62) when said locking means (86) is in said engaged position, said locking means (86) is in said engaged position, said locking means (86) including two flexible fingers (100), one of said flexible fingers (100) extending downwardly from each of said flanks (92), each of said fingers (100) including a projection extending laterally therefrom, said support means (32) including two finger channels (104) positioned along said transverse pathway (88), said fingers (100) being slidably disposed within said finger channels (104), said finger channels (104) including a first (106) and second (108) recess positioned therealong for receiving said projections (102) therein to retain said locking means (86) in said disengaged and engaged positions respectively, said locking means (86) including two flanges (110), one of said flanges (110) extending downwardly from each of said flanks (92), said support means (32) including two flange channels (112) extending along said transverse pathway (88), said flanges (110) being slidably disposed in said flange channels (112) for guiding the movement of said locking means (86) along said transverse pathway (88) between said disengaged and engaged positions, said adjustment means (48), said support means (32) and said locking means (86) being made of organic polymeric materials, said support means (32) having a substantially circular exterior extending about said longitudinal axis (14), said locking means (86) including a head (90) which is contiguous with said substantially circular exterior of said support means (32) when said locking means (86) is in said engaged position, said conduit (12) including collars (114,116) thereon for limiting movement of said adjustment means (48) relative to said support means (32), biasing means (118) disposed between one of said collars (114) and said support means (32) for urging said adjustment means (48) to move relative to said support means (32), said assembly including a support fitting (42) attached to said conduit (12) and adapted for securing said conduit (12) to a support structure.

* * * * *